United States Patent [19]

Trovato

[11] Patent Number: 4,854,532

[45] Date of Patent: Aug. 8, 1989

[54] DEVICES FOR MOUNTING A LOAD AND ORIENTING THE LOAD IN TWO ORTHOGONAL DIRECTIONS

[75] Inventor: Joseph R. Trovato, Rochester, N.Y.

[73] Assignee: Eastman Kodak Company, Rochester, N.Y.

[21] Appl. No.: 286,202

[22] Filed: Dec. 19, 1988

[51] Int. Cl.⁴ ............................................. F16M 11/04
[52] U.S. Cl. ..................................... 248/178; 248/183; 248/652; 248/913
[58] Field of Search .............. 248/178, 177, 179, 183, 248/184, 185, 186, 652, DIG. 13

[56] References Cited

U.S. PATENT DOCUMENTS

| | | | |
|---|---|---|---|
| 3,123,330 | 3/1964 | Forbes-Robinson | 248/183 |
| 3,511,462 | 5/1970 | De Bazignan | 248/179 |
| 3,931,947 | 1/1976 | Tagnon | 248/184 X |
| 4,763,151 | 8/1988 | Klinger | 248/179 X |

Primary Examiner—Ramon O. Ramirez
Attorney, Agent, or Firm—Armin B. Pagel

[57] ABSTRACT

A device for mounting a load and orienting the load in two orthogonal senses includes two facing elements. One element has three spheres disposed in first, second and third seats. A line joining the first and second seats is orthogonal to a line joining the first and third seats. The sphere in the first seat contacts a conical contact surface on the other element. The sphere in the second seat contacts a planar contact surface on the other element. The sphere in the third seat contacts a vee-groove contact surface on the other element. Displacement means, in the form of conical surfaces on threaded rods, associated with the second and third seats serve to displace the spheres outwardly of the second and third seats to cause tipping and tilting of the contact surface bearing element relative to the one element.

6 Claims, 2 Drawing Sheets

DEVICES FOR MOUNTING A LOAD AND ORIENTING THE LOAD IN TWO ORTHOGONAL DIRECTIONS

BACKGROUND OF THE INVENTION

1. Field of the Invention

This invention relates to devices for mounting a load and orienting the load in two orthogonal directions. Such devices are sometimes referred to as tip-tilt stages.

2. Description Relative to the Prior Art

In the publication Mechanism, by Joseph Stiles Beggs, published circa 1951, there is a description of a mount For mounting a theodolite on a stand in such a manner that it can be easily removed and yet go back in the same position. The mount includes three spherical feet on one element of the mount and, on the other element of the mount, there is a conical hole, a vee-groove and a horizontal surface. One of the spherical feet goes in the hole, another of the spherical feet goes in the vee-groove and the third spherical foot contacts the surface. Such an arrangement constrains the two elements against any relative displacement laterally. However, such arrangement does not provide for selective orientation of the two elements relative to one another in senses other than those in which the constraints exist.

SUMMARY OF THE INVENTION

It is an object of the present invention to overcome the disadvantage of the prior art and provide a device for mounting a load and orienting the load in two orthogonal senses.

The present invention achieves the objective by including in the device first and second elements facing one another. One of the elements is adapted to be associated with the load and the other of the elements is adapted to be associated with a base. A first of the elements has three contact zones. The second of the elements has three spheres for contacting the three contact zones of the first element. The second element has first, second and third seats in which the three spheres are disposed. Each of the seats has a center. The first second and third seats are so disposed that a line joining the center of the first seat and the center of the second seat is orthogonal to a line joining the center of the first seat and the center of the third seat. The second element has means for displacing the sphere in the second seat whereby the sphere is displaceable towards said first element for changing the orientation of the first element in a first sense. The second element has means for displacing the sphere in the third seat whereby the sphere is displaceable towards the first element for changing the orientation of the first element in a second sense. The contact zones of the first element are so disposed on the first element as to contact the three spheres. The contact zone which contacts the sphere in the first seat conforms to a cone. The contact zone which contacts the sphere in the second seat is planar. The contact zone which contacts the sphere in the third seat has a vee-groove form with the length of the groove being generally parallel to the line intersecting centers of the first and third seats.

Advantageously, the means for displacing the sphere in the second seat includes a first bore in the second element, intersecting the second seat and being screw-threaded over a portion of its length. There is a first reaction member disposed in part in the first bore and screw-threaded over a portion of its length for cooperating engagement with the screw-threaded first bore and having a conical end portion extending into the second seat. The arrangement is such that rotation of the reaction member causes axial displacement of the conical end portion relative to the second seat and the sphere in the second seat.

The means for displacing the sphere in the third seat may be similar to that described above in respect of the second seat.

The second element may have stops extending one into each of the second and third seats for limiting displacement of the spheres in the second and third seats relative to the second and third seats, upon maximum movement of the conical end portions of the reaction members in directions outwardly of the seats.

The axes of rotation of the reaction members may be parallel and in such case the ends of the reaction members remote from the conical end portions may be close to one another. Such an arrangement is convenient from the standpoint of accessibility.

In embodiments in which gravity does not or is not available to bias the first and second elements towards one another, resilient means may be provided for that purpose.

BRIEF DESCRIPTION OF THE DRAWINGS

An embodiment of the present invention will now be described, by way of example, with reference to the accompanying drawings, in which.

DETAILED DESCRIPTION OF THE PREFERRED EMBODIMENT

Figure 3:
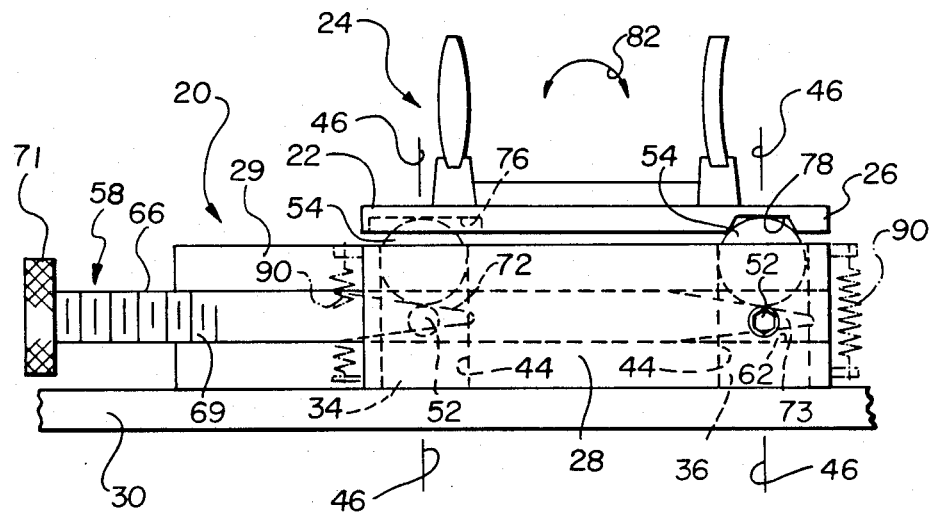
FIG. 3 is a side view of the device illustrated in FIGS. 1 and 2, again with internal features shown in broken lines.

Illustrated in the drawings is a device 20 for mounting a load and orienting the load in two orthogonal senses, in accordance with the present invention. Such a device is sometimes termed a tip-tilt stage. The device 20 has an upper surface 22 on which a load, indicated schematically at 24 in FIG. 3, as being two lenses in their holders, is mounted. In the present embodiment, the upper surface 22 is generally horizontal and gravity is employed to bias parts of the device towards one another, as will be described subsequently herein.

The device 20 includes a first element 26 and a second element 28 which face one another at generally planar opposed surfaces. In the present embodiment, the first element 26 is the upper and is adapted to be associated with the load 24, and the second element 28 is the lower and is adapted to be associated with a base indicated schematically at 30 in FIG. 3.

The second element 28 has first, second and third seats, 32, 34, 36, respectively, for spheres 54, respectively. The second element 28 is in the form of a solid cuboid, with an ear-like extension 29, of metal and the seats 32, 34, 36 are in the form of bores 44 extending through the element 28. Each of the bores 44 has an axis 46 and the three axes are parallel. Any point on each of the three axes 46 may be regarded as the center of the seat formed by the respective bore. The first second and third seats 32, 34, 36 are so disposed that a line 48 joining the centers of the first and second seats 32, 34 is orthogonal to a line 50 joining the centers of the first and third seats 32, 36, see FIG. 2.

Associated with each seat 32, 34, 36 is a stop in the form of a grub screw 52 which is received in a threaded bore in the first element. The grub screws 52 extend into the bores 44 and, in effect, form bottoms to the seats, as will subsequently herein become apparent.

Disposed in each seat 32, 34, 36, above the grub screw 52, is one of the spheres 54 in the form of a ball bearing. The spheres 54 each have a diameter slightly smaller than the diameter of the bore 44 forming the seats so that they are free to slide in the bores without appreciable lateral slop.

Associated with each of the second and third seats 34 and 36, respectively, is means 56 and 58, respectively, for displacing the sphere in the respective seat 34, 36. The displacing means 56 associated with the second seat 34 includes a bore 60 which is screw-threaded over at least a portion of its length, and the axis of which is perpendicular to and intersects the axes 46 of the first and second seats 32 and 34. The axis of the bore 60 also intersects the axes of the bores containing the grub screws 52 associated with the first and second seats.

The displacing means 58 associated with the third seat 36 includes a bore 62 which is screw-threaded over at least a portion of its length, and the axis of which is parallel to the axis of the bore 60 and is perpendicular to and intersects the axis 46 of the third seat 36. The axis of the bore 62 also intersects the axis of the bore containing the grub screw 52 associated with the third seat.

Partially disposed in the bore 60 is a first reaction member 64 and partially disposed in the bore 62 is a second reaction member 66. Each of the reaction members 64 and 66 includes a screw-threaded rod 68 and 69, respectively, having a knurled knob 70 and 71, respectively, at one end and a conical end portion 72 and 73, respectively, at the other end. The conical end portions 72 and 73 extend into the second and third seats 34 and 36, respectively. The screw-threads of the rods 68 and 69 cooperate with the screw threads of the bores 60 and 62, respectively, so that when the rods are rotated by fingers grasping the knurled knobs 70 and 71, respectively, the conical end portions 72 and 73 move further into or are withdrawn progressively out of, as the case may be, the seats. The spheres 54 in the second and third seats rest, under the influence of gravity, on the conical end portions. As the conical end portions are moved into the seats, the spheres are moved upwardly by reaction with the conical end portions and as the conical end portions are withdrawn from the seats the spheres move down in the seats because the diameter of the conical end portions at the point of contact of the spheres with the conical end portions decreases with withdrawal of the displacing means.

The first element 26 has three contact zones 74 76 and 78 for contacting the spheres 54 in the first, second and third seats 32, 34, 36, respectively. The first contact zone 74 is in the form of a conical depression in the under surface of the second element 26 and, because of its shape, contacts the sphere 54 in the first seat 34 on, theoretically, a circular line but usually, practically, at three points. The second contact zone 76 is planar and hence, because of its planar form, contacts the sphere in the second seat 36 at a point. The third contact zone 78 is in the form of a vee-groove with the length of the groove being generally parallel to the line intersecting the centers of the first and third seats 32 and 36, respectively. Because of the vee-form of the third contact zone, it contacts the sphere in the second seat at two points. The first contact zone 74 has been described as conical. Usually, because of imperfections in the sphere and the conical surface, this will result in a three point contact, with the three points conforming to a cone. In another embodiment, the contact zone 74 could be in the form of a three sided pyramid which, again, would give the three point contact. Such an arrangement might have advantage in that the three points of contact would be predetermined, rather than random.

With the forms of the contact zones as described, the first element 26 is constrained against movement relative to the second element 28 in directions parallel to the general plane of the first element 26.

While in the present embodiment the axes of the two displacing means are generally parallel, so that the knobs 70 and 71 are conveniently close to one another, it will be understood that in other embodiments the axes of the displacing means need not be parallel.

Figure 1:
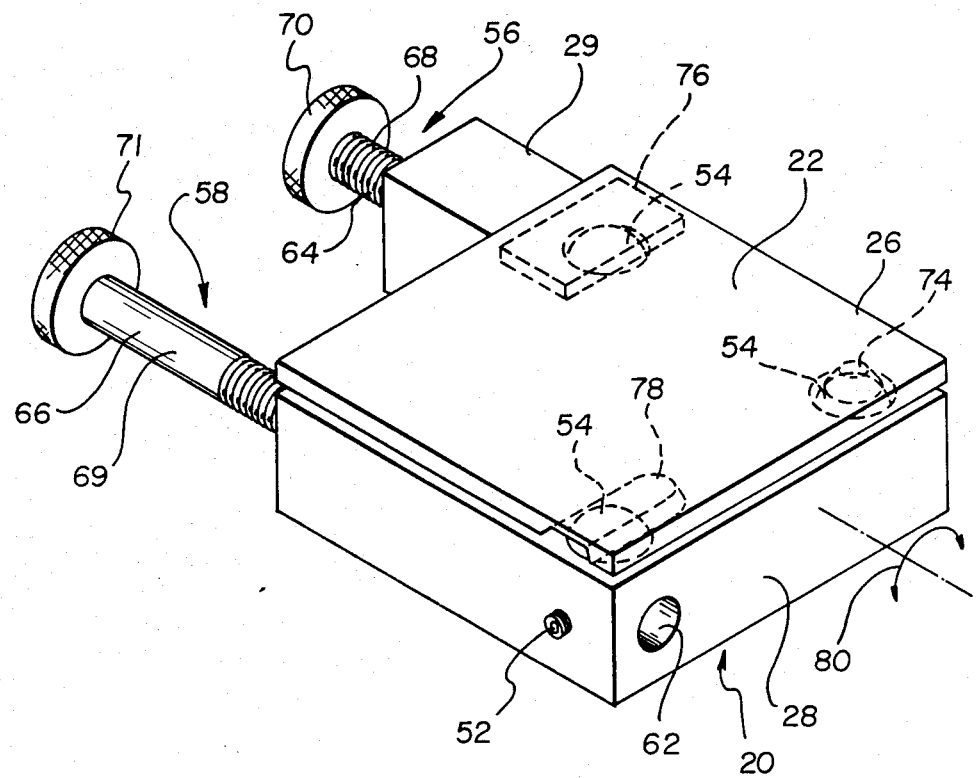
FIG. 1 is a perspective view, from above, of a device in accordance with the present invention.
Figure 2:
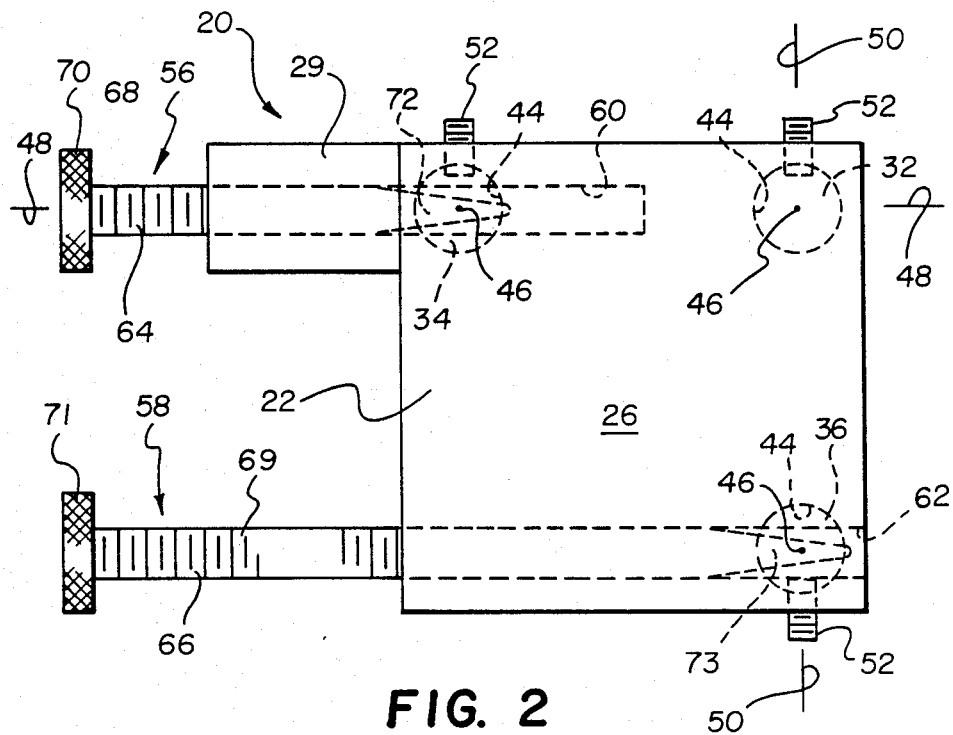
FIG. 2 is a plan view of the device illustrated in FIG. 1, with internal features shown in broken lines, to aid understanding.

When it is desired to alter the orientation of the load 24, the knobs 70 and 71 are rotated appropriately. Clockwise (looking from left to right in FIG. 2) rotation of the knob 71, moves the conical end portion 73 of the displacing means further into the third seat and hence causes the first element 26 to rotate in the clockwise sense of the arrow 80 in FIG. 1 about an axis which is, in part, defined by the contact of the contact zones 74 and 76 with the spheres in the first and second seats 32 and 34. Clockwise (looking from the left as seen in FIG. 2) rotation of the knob 70 moves the conical end portion 72 of the displacing means further into the second seat and hence displaces the sphere in the second seat upwards so that the first element 26 is caused to rotate in the clockwise sense of the arrow 82 in FIG. 3 about an axis in part defined by the contact of the contact zones 74 and 78 with the spheres in the first and third seats 32 and 36, respectively. Thus, it will be apparent that the orientation of a load can be very accurately selected by appropriate manipulation of the knobs 70 and 71.

The stops, in the form of the grubscrews 52 extending into the second and third seats, serve to prevent the spheres in those seats dropping so far, upon excessive withdrawal of the displacing means, that the spheres drop out of the bores in which they are located or block the re-entry of the conical end portions of the displacing means into the seats. The grub screw 52 associated with the first seat constitutes a bottom for that seat.

In the embodiment of the invention described above, the load bearing surface of the first element is approximately horizontal and hence gravity serves to keep the first element in contact with the spheres in the seats of the second element and to keep the spheres seated in their seats. In other embodiments, the orientation of the device may be such that gravity cannot perform such a role, or there may be no gravity. In such cases, for example, in cases in which a plane containing the centers of the three spheres is other than horizontal, resilient means, such as a spring, magnetic means, or a suction device, may be provided for biassing the first and second elements towards one another so that the three contact zones of the first element may be maintained in contact with the spheres and the spheres maintained in contact with their seats. Such resilient means are schematically represented at 90 in FIG. 3.

While in the embodiment described above, the element having the contact zones is associated with a load and the element having the seats and spheres is associated with a base, it is to be understood that the roles may be reversed in other embodiments.

The invention has been described in detail with particular reference to a presently preferred embodiment, but it will be understood that variations and modifications can be effected within the spirit and scope of the invention.

What is claimed is:

1. A device for mounting a load and orienting the load in two orthogonal senses, said device including:

first and second elements facing one another, one of said elements being adapted to be associated with the load and the other of said elements being adapted to be associated with a base;

a first of said elements having three contact zones;

the second of said elements having three spheres for contacting said three contact zones of said first element;

, said second element having first, second and third seats in which said three spheres are disposed, respectively, each of said seats having a center;

said first, second and third seats being so disposed that a line joining the center of the first seat and the center of the second seat is orthogonal to a line joining the center of the first seat and the center of the third seat;

said second element having means for displacing the sphere in the second seat whereby said sphere is displaceable towards said first element for changing the orientation of the first element in a first sense;

said second element having means for displacing the sphere in the third seat whereby the sphere in said seat is displaceable towards said first element for changing the orientation of the first element in a second sense;

said contact zones of said first element being so disposed on said first element as to contact said three spheres;

the contact zone which contacts the sphere in the first seat conforming to a cone;

the contact zone which contacts the sphere in the second seat being planar; and the contact zone which contacts the sphere in the third seat having a vee-.groove form with the length of the groove being generally parallel to the line intersecting the centers of the first and third seats.

2. A device as claimed in claim 1, wherein:

said means for displacing the sphere in the second seat includes;

a first bore in said second element intersecting said second seat, said first bore being screw-threaded over a portion of its length; and a first reaction member disposed in part in said first bore and screw-threaded over a portion of its length for cooperating engagement with the screw-threaded first bore and having a conical end portion extending into said second seat; the arrangement being such that rotation of the reaction member causes axial displacement of the conical end portion relative to the second seat and the sphere in the second seat.

3. A device as claimed in claim 2, wherein:

said means for displacing the sphere in the third seat includes:

a second bore in said second element and intersecting said third seat, said second bore being screw-threaded over a portion of its length;

a second reaction member disposed in part in said second bore and screw-threaded over a portion of its length for cooperating engagement with the screw-threaded second bore and having a conical end portion extending into said third seat; the arrangement being such that rotation of the second reaction member causes axial displacement of the conical end portion relative to the third seat and the sphere in the third seat.

4. A device as claimed in claim 3, wherein:

said second element has stops extending one into each of said second and third seats for limiting displacement of the spheres in the second and third seats relative to the second and third seats upon maximum movement of the conical end portions of the reaction members in directions outwardly of the seats.

5. A device as claimed in claim 3, wherein said reaction members have axes about which they are rotated to cause axial movement of the reaction members relative to said second element, and said axes are parallel and the ends of the reaction members remote from their conical end portions are adjacent one another.

6. A device as claimed in any one of the preceding claims, wherein a plane in which lie the centers of the three spheres is other than horizontal and, said device further includes resilient means for biassing the first and second elements towards one another whereby the three contact zones of said first element are maintained in contact with the three spheres and the sphere in the first seat is maintained in contact with the first seat and the spheres in the second and third seats are maintained in contact with said means for displacing the spheres in the second and third seats relative to the second and third seats.

* * * * *